US008009669B2

(12) United States Patent
Lee

(10) Patent No.: US 8,009,669 B2
(45) Date of Patent: Aug. 30, 2011

(54) SYSTEM OF PATH COMPUTATION ELEMENT PROTOCOL SUPPORT FOR LARGE-SCALE CONCURRENT PATH COMPUTATION

(75) Inventor: Young Lee, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 615 days.

(21) Appl. No.: 11/549,756

(22) Filed: Oct. 16, 2006

(65) Prior Publication Data
US 2008/0089346 A1 Apr. 17, 2008

(51) Int. Cl.
G04L 12/28 (2006.01)

(52) U.S. Cl. ......................... 370/389; 709/223

(58) Field of Classification Search ............ 370/216, 370/242, 389, 254; 709/223, 224
See application file for complete search history.

(56) References Cited

U.S. PATENT DOCUMENTS

| | | | |
|---|---|---|---|
| 5,680,580 A * | 10/1997 | Beardsley et al. | 714/6 |
| 5,872,918 A * | 2/1999 | Malomsoky et al. | 709/220 |
| 6,807,179 B1 | 10/2004 | Kanuri et al. | |
| 7,426,562 B1 | 9/2008 | Johri et al. | |
| 2001/0012298 A1 | 8/2001 | Harshavardhana et al. | |
| 2003/0217129 A1* | 11/2003 | Knittel et al. | 709/223 |
| 2004/0081105 A1 | 4/2004 | Shimazaki et al. | |
| 2005/0111349 A1* | 5/2005 | Vasseur et al. | 370/216 |
| 2006/0023587 A1* | 2/2006 | Kim | 369/47.1 |
| 2006/0039391 A1 | 2/2006 | Vasseur et al. | |
| 2006/0098657 A1 | 5/2006 | Vasseur et al. | |
| 2006/0101142 A1 | 5/2006 | Vasseur et al. | |
| 2006/0212556 A1* | 9/2006 | Yacoby et al. | 709/223 |
| 2006/0268682 A1* | 11/2006 | Vasseur | 370/216 |
| 2007/0019558 A1 | 1/2007 | Vasseur et al. | |
| 2007/0058568 A1 | 3/2007 | Previdi et al. | |

FOREIGN PATENT DOCUMENTS

| | | |
|---|---|---|
| CN | 1866852 A | 11/2006 |
| CN | 1870570 A | 11/2006 |
| JP | 2004129135 A | 4/2004 |
| WO | 2005107192 A1 | 11/2005 |

OTHER PUBLICATIONS

Lee, Y., et al.; "Path Computation Element Communication Protocol (PCECP) Requirements for Support of Global Concurrent Optimization"; draft-lee-pce-global-concurrent-optimization-00.txt; Oct. 11, 2006; 16 pgs.
PCT International Search Report; PCT/CN2007/070910; Jan. 24, 2008; 5 pgs.
PCT Written Opinion of the International Searching Authority; PCT/CN2007/070910; Jan. 24, 2008; 9 pgs.

(Continued)

Primary Examiner — Dang Ton
Assistant Examiner — Wei Zhao
(74) Attorney, Agent, or Firm — Conley Rose, P.C.; Grant Roldolph

(57) ABSTRACT

A system for a global concurrent path computation in a communication network is disclosed. The system includes a path computation element communication protocol, wherein the protocol includes an indicator field indicating the global concurrent path computation, a global objective function field providing an overarching objective function, a global constraint field specifying at least one global constraint, a global concurrent vector field specifying at least one path computation request, and another indicator field indicating an outcome of a path computation request.

27 Claims, 2 Drawing Sheets

OTHER PUBLICATIONS

Le Roux, J. L.; "Requirements for Path Computation Element (PCE) Discovery"; Network Working Group; Jun., 2006; 19 pgs.

Awduche; D., et al.; "RSVP-TE: Extensions to RSVP for LSP Tunnels"; Network Working Group; Dec. 2001; 57 pgs.

Bradner, S.; "Key Words for Use in RFCs to Indicate Requirement Levels"; Network Working Group; Mar. 1997; 3 pgs.

Lee, Young; "Distributed PCE-Based System and Architecture in a Multi-Layer Network" U.S. Appl. No. 11/549,740, filed Oct. 16, 2006; Specification 29 pgs.; 4 Drawing Sheets (Figures 1-4).

Oki, Eiji, et al.; "Framework for PCE-Based Inter-Layer MPLS and GMPLS Traffic Engineering"; Network Working Group; Jun. 2006; 17 pgs.

Vasseur; J.P., et al.; "Path Computation Element (PCE) Communication Protocol (PCEP)"; Version 1; Network Working Group; Jun. 22, 2006; 56 pgs.

Farrel; A., et al.; "A Path Computation Element (PCE)-Based Architecture"; Network Working Group; Aug. 2006; 38 pgs.

Ash, J., et al.; "Path Computation Element (PCE) Communication Protocol Generic Requirements"; Network Working Group; Sep. 2006; 20 pgs.

Shiomoto, Kohei, et al.; Requirements for GMPLS-Based Multi-Region and Multi-Layer Networks (MRN/MLN); Network Working Group; Oct. 2006; 21 pgs.

Foreign Communication From a Related Counterpart Application—International Search Report and Written Opinion, PCT/CN2007/070408, Nov. 8, 2007, 8 pages.

Foreign Communication From a Related Counterpart Application—Supplementary European Search Report, EP 07764273.4, Dec. 8, 2008, 12 pages.

Oki, Eiji, et al., "Dynamic Multilayer Routing Schemes in GMPLS-Based IP + Optical Networks," IEEE Communications Magazine, Jan. 2005, pp. 108-114.

Oki, Eiji, et al., "Performance Evaluation of Dynamic Multi-Layer Routing Schemes in Optical IP Networks," IEICE Trans. Commun., vol. E87-B, No. 6, Jun. 2004, pp. 1577-1583.

Oki, Eiji, et al., "Requirements for Path Computation Element in GMPLS and IP/MPLS Networks," draft-oki-pce-gmpls-req-01.txt, IETF Network Working Group, Internet Draft, Oct. 2004, 26 pgs.

Sato, Ken-Ichi, et al., "GMPLS-Based Photonic Multilayer Router (Hikari Router) Architecture: An Overview of Traffic Engineering and Signaling Technology," IEEE Communications Magazine, Mar. 2002, pp. 96-101.

Swallow, George, "MPLS Advantages for Traffic Engineering," IEEE Communications Magazine, Cisco Systems, Dec. 1999, pp. 54-57.

Office Action dated Feb. 26, 2009, U.S. Appl. No. 11/549,740, filed Oct. 16, 2006, 45 pages.

Le Roux, J.L., et al. "IS-IS Protocol Extensions for Path Computation Element (PCE) Discovery," Network Working Group, Internet Draft, draft-ietf-pce-disco-proto-isis-00,txt, Sep. 2006, 21 pgs.

Le Roux, J.L., et al. "OSPF Protocol Extensions for Path Computation Element (PCE) Discovery," Network Working Group, Internet Draft, draft-ietf-pce-disco-proto-ospf-00,txt, Sep. 2006, 24 pgs.

Vasseur, JP, et al. "A Backward Recursive PCE-based Computation (BRPC) Procedure to Compute Shortest Inter-Domain Traffic Engineering Label Switched Paths," Network Working Group, Internet-Draft, draft-ietf-pce-brpc-00,txt, Aug. 31, 2006, 16 pgs.

Office Action dated Aug. 11, 2009, U.S. Appl. No. 11/549,740, filed Oct. 16, 2006, 41 pages.

Foreign Communication from a Related Application—European Supplementary Search Report—EP application No. 07817101.4, Sep. 7, 2009, 7 pages.

Office Action dated Nov. 4, 2009, U.S. Appl. No. 11/549,740, filed Oct. 16, 2006, 24 pages.

Office Action dated May 5, 2010, U.S. Appl. No. 11/549,740, filed Oct. 16, 2006, 24 pages.

Foreign communication from a counterpart application, Chinese application 200780032952.X, office action dated Sep. 14, 2010, 5 pages.

Foreign communication from a counterpart application, Chinese application 200780032952.X, English Translation office action dated Sep. 14, 2010, 6 pages.

Foreign communication from a counterpart application, Chinese application 200780032952.X, Office Action dated Sep. 14, 2009, 5 pages.

Foreign communication from a counterpart application, Chinese application 200780032952.X, Partial English Translation Office Action dated Sep. 14, 2009, 5 pages.

* cited by examiner

SYSTEM OF PATH COMPUTATION ELEMENT PROTOCOL SUPPORT FOR LARGE-SCALE CONCURRENT PATH COMPUTATION

CROSS-REFERENCE TO RELATED APPLICATIONS

This application is related to: U.S. application Ser. No. 11/549,740, filed concurrently with the present invention on Oct. 16, 2006, entitled "DISTRIBUTED PCE-BASED SYSTEM AND ARCHITECTURE IN A MULTI-LAYER NETWORK", by Young Lee.

FIELD OF INVENTION

The present invention generally relates to path computation in communication networks, and more specifically, relates to path computation element protocol in support of a large-scale concurrent path computation in communication networks.

BACKGROUND OF THE INVENTION

A Path Computation Element (PCE) is an entity that is capable of computing a network path or route based on a network topology, and applying computational constraints to the computation. The capability of a PCE to compute different types of paths allows a PCE to provide traffic engineering functions.

A PCE-based network architecture defines PCEs to perform computation of a multi-layer path, and take constraints into consideration. A multi-layer network may be considered as distinct path computation regions within a PCE domain, and therefore, a PCE-based architecture is useful to allow path computation from one layer network region, across the multi-layer network, to another layer network region. A PCE may be placed on a single network node with high processing capabilities, or several PCEs might be deployed on nodes across a network.

A large-scale path computation need may arise when network operators need to set up a large number of Traffic Engineering Label Switched Paths (TE-LSPs) in a network planning process. Hence, a large-scale path computation is typically an off-line computation.

The off-line computation requirements to support a large number of TE-LSPs are quite different from on-line path computation requirements. While on-line path computation is focused on finding the best path given network conditions in timely manner, a large-scale off-line path computation application involves finding a large number of TE-LSPs that concurrently meet a global objective.

While off-line computation may not require as stringent time constraint as on-line path computation, the key objective associated with large-scale off-line computation is to efficiently allocate network resources from a global network perspective. While on-line path computation is tactical, off-line large-scale path computation is strategic.

As a Path Computation Element (PCE) is considered to provide solutions in path computation in a communication network, a PCE may provide solutions for large-scale off-line concurrent path computation needs.

Therefore, there is a need for a system that provides efficient and feasible capability enabling a PCE to perform a global concurrent path computation.

SUMMARY OF THE INVENTION

The present invention discloses a versatile system for a global concurrent path computation in a network planning.

The system provides a path computation element (PCE) communication protocol that may be used in communication between a PCE agent and a PCE for the global concurrent path computation. This protocol may include an indicator field indicating the global concurrent path computation, a global objective function field providing an overarching objective function, a global constraint field specifying at least one global constraint, a global concurrent vector field specifying at least one path computation request for functions of the global objective function field and the global constraint field, and another indicator field indicating an outcome of a path computation request.

In addition, the present invention further discloses an iterative path computation when a PCE receives a session of infeasible path computation requests from a PCE agent. The iterative path computation comprises the steps of the PCE agent partitions the session of infeasible path computation requests to a plurality of sessions that are feasible for path computation, and the PCE performs a path computation for each of the plurality of sessions using the PCE communication protocol and replies to the PCE agent after each path computation.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The present invention is hereafter in relation to certain exemplary embodiments below. It is understood, however, that the embodiments below are not necessarily limitations to the present disclosure. Although only a few exemplary embodiments of this invention have been described in detail, those skilled in the art will readily appreciate that many modifications are possible in the exemplary embodiments. It is understood that modifications, changes and substitutions are intended in the foregoing disclosure, and in some instances some features of the invention will be employed without a corresponding use of other features.

The present invention provides a system for a large-scale concurrent path computation in a network planning. A large-scale concurrent path computation is a path computation application where a large number of traffic engineering paths need to be computed concurrently in order to efficiently utilize network recourses. This large-scale concurrent path computation is referred to as a global concurrent path computation. The global concurrent path computation described in the present invention is typically conducted off-line. However, the global concurrent path computation may also be conducted on-line, particularly when a system encounters a catastrophic failure.

Figure 1:
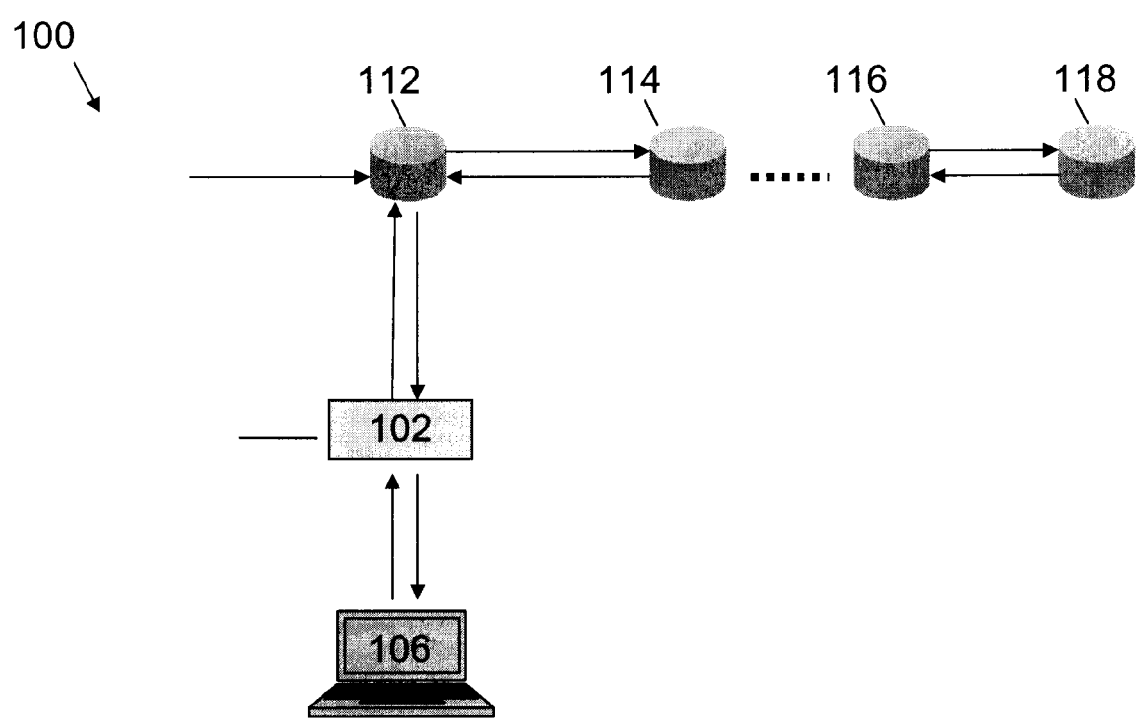
FIG. 1 depicts a simplified Path Computation Element (PCE) based system according to the present invention.

Referring to FIG. 1, a simplified Path Computation Element (PCE) based system (100) is illustrated. System (100) includes an Ingress Node (112), a plurality of intermediate nodes represented by Node (114) and Node (116), and an Egress Node (118). These nodes are connected through communication links. System (100) also includes a PCE (102) and a PCE agent (106). As shown in FIG. 1, PCE (102) may serve as an independent server performing a path computation for System (100) upon communication with PCE agent (106). System (100) may include multiple PCEs and PCE agents.

PCE agent (106) may have many functions including, but not limited to: initiating a global concurrent path computation to PCE (102) based on a traffic demand matrix in System (100); formulating a global concurrent path computation request to PCE (102); interacting with a policy server to derive all decision parameters required in the global concurrent path computation; and facilitating PCE (102) to perform an iterative path computation when the global concurrent path computation fails.

When PCE (102) determines that one session of a plurality of global concurrent path computation requests sent by PCE agent (106) is infeasible, upon receiving a reply from PCE (102), PCE agent (106) may partition the session into a plurality of sessions, each of the plurality of sessions may be feasible for PCE (102) to perform a path computation. In addition, PCE agent (106) may correlate each of the plurality of sessions and interact with PCE (102) to avoid double booking when PCE (102) performs the iterative path computation.

Moreover, when PCE (102) can compute point-to-multipoint paths, PCE agent (106) may derive point-to-multipoint traffic matrix for point-to-multipoint path computation.

To perform a global concurrent path computation, the present invention provides a system for implementing a PCE communication protocol. This PCE communication protocol may provide capabilities either through creation of new objects and/or modification to existing objects in a PCE based system.

This protocol may include:

An indicator to convey that a path communication request is a global concurrent path computation. This indicator may ensure consistency in applying global objectives and global constraints in all path computations.

A Global Objective Function (GOF) field in which to specify a global objective function. The global objective function may be an overarching objective function to which all individual path computation requests are subjected in order to find a globally optimal solution. The field may include following objective functions at the minimum and should be expandable for future addition: minimize the sum of all Traffic Engineering Label Switched Path (TE-LSP) costs; and minimize the most utilized TE-LSPs.

A Global Constraints (GC) field in which to specify a list of global constraints to which all the requested path computations may be subjected in its path computations. This list may include the following constraints and may be expandable for future addition: maximum link utilization parameter (between 0 and 1) for all links; minimum link utilization parameter (between 0 and 1) for all links; maximum number of hops for all the TE-LSPs; exclusion of links/nodes in all TE-LSP path computations (i.e., all LSPs should not include the specified links/nodes in the path); and a list of existing or known TE-LSPs that may be kept intact without any modification. This capability may be useful in minimizing disruption when a global reconfiguration may need to be made.

A Global Concurrent Vector (GCV) field in which to specify all individual path computation requests that are subject to concurrent path computation and subject to the global objective function and all of the global constraints.

An indicator field to indicate an outcome of a path computation request. When PCE (102) can not find a feasible solution with an initial request, the indicator may indicate a reason for infeasibility. The reason may be a feasible solution found; mathematically infeasible; or a memory overflow.

A Multi-Session Indicator field in a situation where the original request is sub-divided into a plurality of sessions. This situation may arise when the reason for infeasibility of the original request is due to mathematically infeasibility, or due to memory overflow. PCE agent (106) may follow up with subsequent actions under a local policy. PCE agent (106) may decide to scale down the original request into several sessions and make requests to PCE (102) in several sessions. This is to find a partial feasible solution in the absence of an optimal solution.

Regarding the Multi-Session Indicator field, a list of existing TE-LSPs that should be kept without any modification (Note that this may be indicated in the aforementioned Global Constraints (GC) field). During multiple sessions of path computations, the successfully computed paths from PCE (102) to PCE agent (106) in a session may be indicated as a constraint (i.e., as the TE-LSPs that should be kept) in a next session computation by PCE (102) so that PCE (102) may avoid double booking. If PCE (102) is a stateless PCE, this indication is essential.

When PCE agent (106) receives a path computation result that indicates that the original computation request is infeasible (mathematically or memory overflow), it may try another option under policy. The policy option is "iterative path computation." Iterative path computation may partition one session of concurrent path computation requests (say M total path computation request) into N sessions (M>N) so that each session would require less computational burden than one single big session. This option may be exercised when a large scale optimization computation fails to find a feasible solution.

When session of a plurality of path computation requests is sent to PCE (102) by PCE agent (106), PCE agent (106) may correlate all these multiple sessions and interact appropriately with PCE (102) for each session. In order to avoid a double booking by PCE (102) which normally is a stateless PCE, it is critical for PCE agent (106) to make PCE (102) be aware of the already committed resources associated with the sessions.

Figure 2:
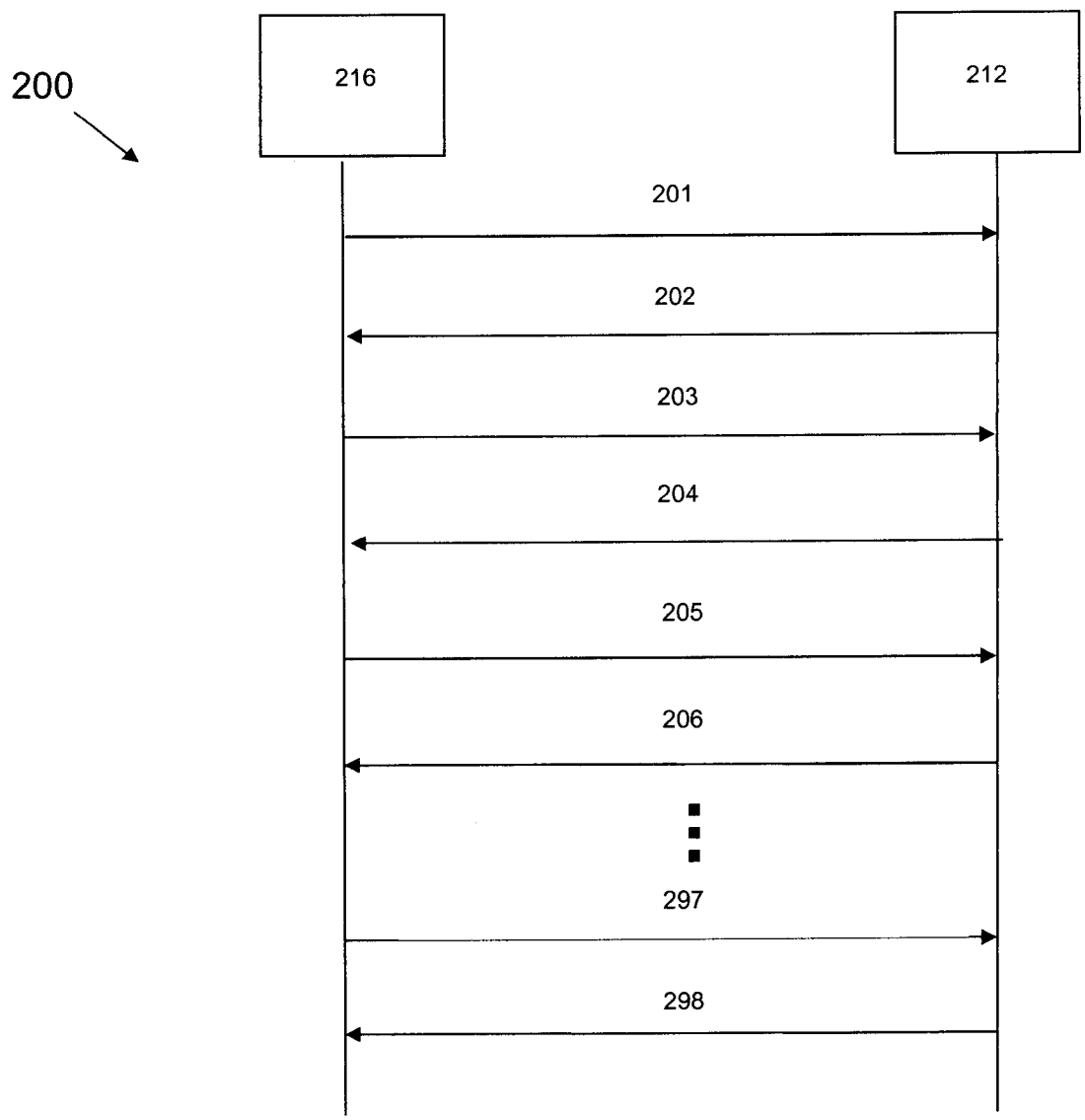
FIG. 2 depicts a flow diagram for an iterative path computation according to the present invention.

FIG. 2 illustrates the steps of an iterative path computation (200). In (200), a PCE agent (216) sends a first session of path computation requests to a PCE (212) at step (201). PCE (212) replies to PCE agent (216) indicating that the first session of all path computation requests is infeasible at step (202). PCE agent (216) then partitions the session to a plurality of iterative sessions, each iterative session may contain a portion of the all path computation session. PCE agent (216) then sends a first iterative session to PCE (212) at step (203). At step (204), PCE (212) performs a path computation based on the first iterative session and reply to PCE agent (216). PCE agent (216) then sends a second iterative session to PCE (212) at step (205), and at step (206) PCE (212) performs another path computation based on the second iterative session and replies to PCE agent (216).

In these iterative sessions, PCE agent (216) may include a list of new path computation requests, as well as information on an LSP bandwidth already committed to resulting LSPs in the first session as part of the Global Constraint (GC) for that particular computation. The already committed bandwidth information may be considered in order for PCE (212) to avoid double booking in a new path computation associated with a new session.

This process may be repeated until all iterative sessions are completed. At step (297), PCE agent (216) sends a last iterative session to PCE (212), and at step (298) PCE (212) performs a path computation based on the last iterative session and replies to PCE agent (216). The iterative path computation may find a feasible solution in the absence of a global optimal solution. While sequential path computation (computing path one by one) is expected to result in sub-optimal solution far from the global optimal solution, iterative path computation tries to find a middle ground between sequential path computation and simultaneous path computation.

The present invention provides a global path computation that may be applied to a number of systems. One such system is Greenfield Traffic Engineering. When a new traffic engineering network needs to be provisioned from a green-field perspective, large numbers of TE-LSPs need to be created based on a traffic demand, topology and network resources. Under this scenario, concurrent computation ability is highly desirable or required to utilize network resources in an optimal manner. Sequential path computation could potentially result in sub-optimal use of network resources.

Another application involves existing network re-optimization. A need for concurrent path computation in a large scale may also arise in existing networks. When existing TE-LSP networks experience sub-optimal use of resources, a need for re-optimization or reconfiguration may arise. The scope of re-optimization and reconfiguration may vary depending on particular situations. The scope of re-optimization may be limited to bandwidth modification to an existing TE-LSP. However, a large number of TE-LSPs may need to be re-optimized concurrently. In an extreme case, TE-LSPs may need to be globally re-optimized.

Another example is multi-layer traffic engineering. When an optical transport layer provides lower-layer traffic engineered LSPs for upper-layer client LSPs via a Hierarchical LSP (H-LSP) mechanism, an operator may desire to pre-establish optical LSPs in an optical transport network. In this scenario, a large number of H-LSPs may be created concurrently to efficiently utilize network resources. Again, concurrent path computation capability may result in an efficient network resource utilization.

Still another application is reconfiguration of a network using Virtual Network Topology (VNT). A concurrent large-scale path computation may be applicable in an VNT reconfiguration. Triggers for the VNT reconfiguration, such as traffic demand changes and topological configuration changes, may require a large set of existing LSPs to be re-allocated. A concurrent path computation capability may result in an efficient network resource utilization.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for a global concurrent path computation in a communication network, comprising:
   a plurality of nodes;
   a plurality of links disposed between the nodes;
   a plurality of Traffic Engineering Label Switched Paths (TE-LSPs) extending across at least some of the nodes and at least some of the links;
   at least one Path Computation Element (PCE) in communication with at least some of the nodes and configured to compute the TE-LSPs; and
   at least one PCE agent in communication with the PCE and configured to process a TE-LSP path computation request;
   wherein the global concurrent path computation concurrently computes a plurality of TE-LSPs extending from the plurality of nodes,
   wherein the global concurrent path computation is performed in the at least one PCE through communication with the at least one PCE agent using a PCE communication protocol, and
   wherein the PCE communication protocol comprises a global objective function field providing an overarching objective function, and
   wherein the global objective function field comprises at least one field for minimizing a load on a most used link.

2. The system in claim 1, wherein the PCE communication protocol comprises a first indicator field indicating the global concurrent path computation.

3. The system in claim 1, wherein the PCE communication protocol comprises a global constraint field specifying at least one global constraint.

4. The system in claim 3, wherein the global constraint field further comprises at least one field providing functions selected from the group consisting of: a maximum link utilization parameter for all links;
   a minimum link utilization parameter for all links;
   a maximum number of hops for the TE-LSPs;
   at least some of the links, at least some of the nodes, or both to exclude from the path computation; and
   at least some of the TE-LSPs that should not be modified in the path computation.

5. The system in claim 1, wherein the PCE communication protocol comprises a global concurrent vector field specifying at least one path computation request for the global concurrent path computation.

6. The system in claim 1, wherein the PCE communication protocol comprises a second indicator field indicating an outcome of a path computation request.

7. The system in claim 6, wherein the second indicator field further comprises at least one field indicating a feasible solution found signal, a mathematically infeasible signal, or a memory overflow signal.

8. The system in claim 1, wherein the PCE communication protocol comprises a multi-session indicator field indicating a session of a plurality of path computation requests is divided into a plurality of sessions.

9. The system in claim 1, wherein the PCE communication protocol comprises:
   a first indicator field indicating the global concurrent path computation;
   a global constraint field specifying at least one global constraint;
   a global concurrent vector field specifying at least one path computation request for functions of the global objective function field and the global constraint field; and
   a second indicator field indicating an outcome of a path computation request.

10. The system in claim 9, wherein the PCE communication protocol further comprises a multi-session indicator indicating a session of a plurality of path computation requests is divided into a plurality of sessions.

11. The system in claim 1, wherein the at least one PCE receives a session of a plurality of path computation requests from the at least one PCE agent, and performs a path computation using the PCE communication protocol.

12. The system in claim 11, wherein the at least one PCE determines whether the session is feasible for a global path computation.

13. The system in claim 12, wherein if the at least one PCE determines that the session is feasible for the global path computation, then the at least one PCE performs the global path computation using the PCE communication protocol.

14. The system in claim 12, wherein if the at least one PCE determines that the session is infeasible for the global path computation, then the at least one PCE performs an iterative path computation using the PCE communication protocol.

15. The system in claim 14, wherein the session is infeasible for the global path computation is due to mathematically infeasibility or a memory overflow.

16. The system in claim 14, wherein the iterative path computation comprises the steps of:
the at least one PCE agent sends a session of a plurality of path computation requests to the at least one PCE,
the at least one PCE performs a path computation and determines that the session is infeasible for the global path computation, and reply to the at least one PCE agent,
the at least one PCE agent partitions the session to a plurality of iterative sessions that are feasible for the global path computation,
the at least one PCE agent sends each of the plurality of iterative sessions to the at least one PCE, and
the at least one PCE performs the global path computation for each of the plurality of sessions using the PCE communication protocol, and replies to the at least one PCE agent after each global path computation for each of the plurality of iterative sessions.

17. The system in claim 1, wherein the global concurrent path computation is performed in a system selected from the group consisting of a Greenfield traffic engineering, existing network re-optimization, multi-layer traffic engineering, and reconfiguration of a network using Virtual Network Topology.

18. The system in claim 1, wherein the global concurrent path computation is performed off-line.

19. The system in claim 1, wherein the global concurrent path computation is performed on-line.

20. A network element comprising:
a transmitter configured to transmit a data structure associated with a path spanning a plurality of nodes and a plurality of links, the data structure comprising:
a first indicator field indicating the global concurrent path computation;
a global objective function field that indicates that a global objective function is to minimize a load on a most used link; and
a global constraint field specifying at least one global constraint comprising a maximum number of hops for at least some of the paths, a maximum utilization for at least some of the links, a minimum utilization for at least some of the links, or combinations thereof;
a global concurrent vector field specifying at least one path computation request for functions of the global objective function field and the global constraint field;
a second indicator field indicating an outcome of a path computation request; and
a multi-session indicator field indicating a session of a plurality of path computation requests is divided into a plurality of sessions, and
wherein the global constraint further comprises an exclusion of a node, a link, or both from the path.

21. A method comprising:
receiving a path computation request comprising a global objective function field that indicates an objective for a global concurrent path computation; and
performing the global concurrent path computation, thereby producing a plurality of paths,
wherein the path computation request is originated by a PCE agent that is not part of any of the paths;
wherein the path computation request further comprises:
a first indicator field indicating the global concurrent path computation; a global constraint field specifying at least one global constraint;
a global concurrent vector field specifying at least one path computation request for functions of the global objective function field and the global constraint field;
and a second indicator field indicating an outcome of a path computation request,
wherein performing the global path computation uses the objective to compute a first path extending from a first node and a second path extending from a second node,
wherein the computation of the first path and the second path is performed concurrently at a central location, and
wherein the set of paths comprises the plurality of paths.

22. The method of claim 21, wherein the path computation request further comprises a multi-session indicator field indicating a session of a plurality of path computation requests is divided into a plurality of sessions.

23. The method of claim 21, wherein the objective comprises minimizing a load on a most used link or minimizing a cumulative cost of a set of paths/

24. The method of claim 21, wherein the global constraint comprises: a maximum number of hops, a maximum utilization percentage, a minimum utilization percentage, or combinations thereof.

25. The method of claim 21, wherein the method is performed by a path computation element and the path computation request is received from a path computation agent.

26. The system of claim 1, wherein the PCE agent initiates the global concurrent path computation and is not part of the TE-LSP.

27. The system in claim 1, wherein one PCE concurrently computes at least two of the plurality of TE-LSPs extending from the plurality of nodes.

* * * * *